Nov. 1, 1966  L. M. O. CYMBALISTY  3,282,592
TIMER ACTUATED SHAFT SEALING DEVICE
Filed June 28, 1963  2 Sheets-Sheet 2

TO GLAND LOADING PISTON

INVENTOR
LUBOMYR M. O. CYMBALISTY

BY *Beale and Jones*
ATTORNEYS

United States Patent Office 3,282,592
Patented Nov. 1, 1966

3,282,592
TIMER ACTUATED SHAFT SEALING DEVICE
Lubomyr M. O. Cymbalisty, Edmonton, Alberta, Canada, assignor, by direct and mesne assignments, of thirty percent to Cities Service Athabasca Inc., New York, N.Y., a corporation of Delaware, thirty percent to Imperial Oil Limited, a corporation of Canada, thirty percent to Atlantic Richfield Company, a corporation of Pennsylvania, and ten percent to Royalite Oil Company Limited, a corporation of Canada
Filed June 28, 1963, Ser. No. 291,514
12 Claims. (Cl. 277—3)

This invention relates to an improvement in the construction and operation of sealing devices for rotating shafts, and especially to such apparatus which compresses a shaft packing material which is enclosed within a stuffing box.

More particularly, this relates to such a device which is capable of maintaining the packing material under a normal compressional load during routine operations, and periodically applying a greatly increased compressional load. The application of the greater force will cause the packing material to seat on the shaft to minimize the leakage therearound. This device may be pneumatically operated, or it may work by employing various combinations of well-known mechanical elements, in a manner more fully described hereinbelow.

It is an object of this invention to provide relatively simple and inexpensive apparatus which will permit a more efficient use of packing material, minimizing the need for frequent replacement due to wear and overheating.

Another object is to provide means especially useful for seals used in abrasive environments; whereby the wear on the rotating shaft may be considerably reduced. This is done by maintaining the packing under a lesser compressional force than is necessary with conventional apparatus. The use of the smaller force is possible, since means are provided to periodically exert a relatively strong force on the packing. This strong force causes the packing to seat firmly about the rotating shaft so that it may later operate with little leakage or wear at the relatively low compressional force used for normal operations.

Still another object of this invention is to provide a unique fluid pressure system which charges an expansible chamber pneumatic or hydraulic device to provide the compressional forces exerted on the packing material.

These and other objects are achieved by having a device which has normally operating means for applying a first compressional force on the packing material, and periodically operated means for exerting a greater force on the packing material for a relatively short time interval.

The instant invention may be more fully understood by a study of the drawings wherein.

Figure 1:
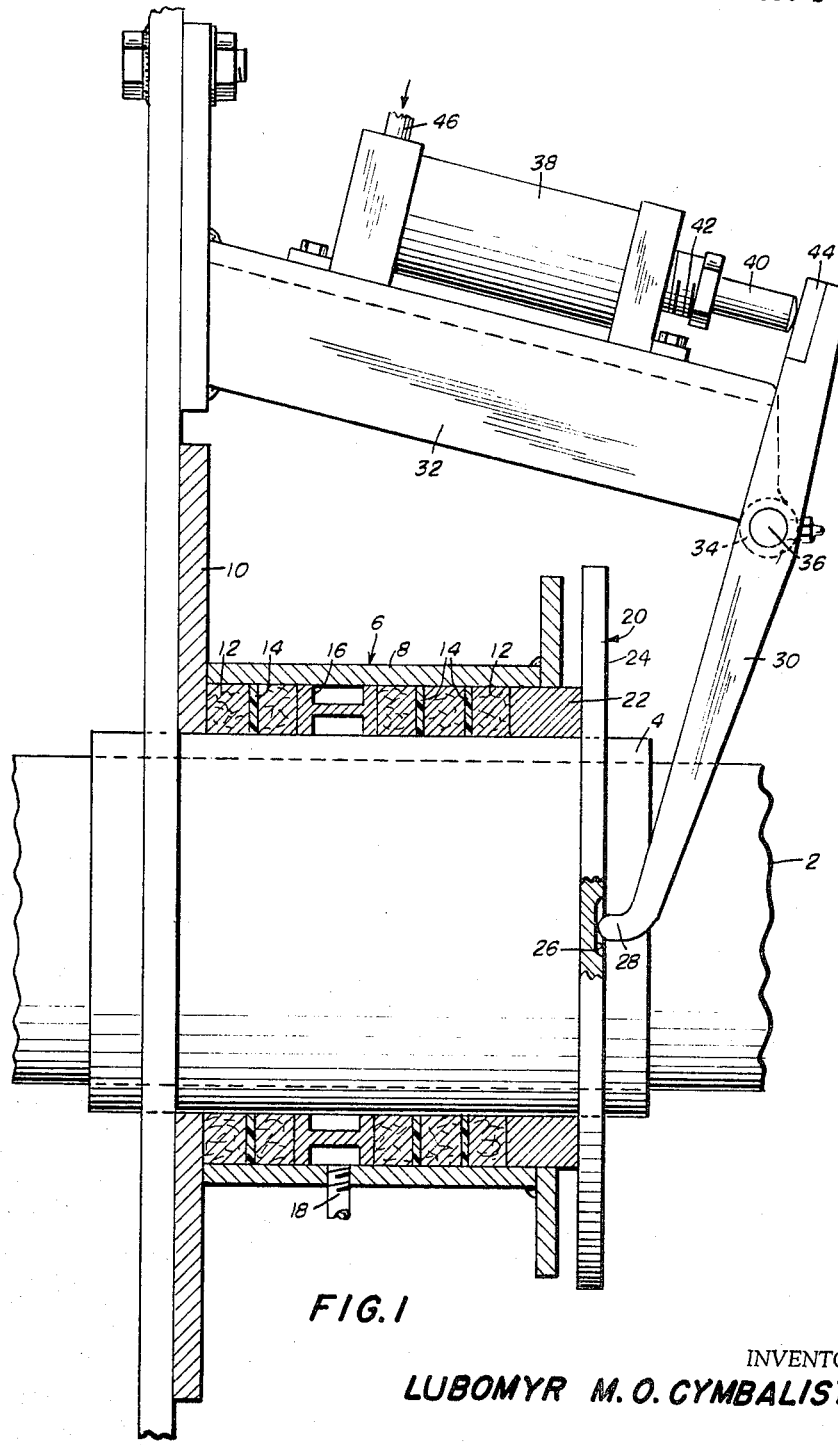
FIG. 1 is a side view, partially in section, of the seal assembly including the rotating shaft, stuffing box, gland, and the novel means for applying a force to the packing material.

In the preferred embodiment, the forces exerted on the packing material are developed by a pneumatic cylinder capable of providing the requisite high and low forces. As shown in FIG. 1, this cylinder is conveniently mounted above the stuffing box, and the piston rod is mechanically connected to a first class lever which has its lower end riding against the axially movable gland member.

In FIG. 1, it will be seen that the rotating shaft 2 carries a hard sleeve 4 which is surrounded by a stuffing box 6 of conventional construction. The stuffing box comprises a tubular member 8 which has its central aperture partially obstructed at one end by a plate 10 which prevents the displacement of the packing material therefrom. The packing material 12 comprises a plurality of rings which may be of any conventional material. For some applications it has proven most advantageous to use packing rings 12 which have been impregnated with Teflon and which are separated by annular Teflon separators 14. Teflon is the trademark for polytetrafluoroethylene, manufactured by the Du Pont Corporation of Wilmington, Delaware.

Intermediate two of the rings of packing material, a lantern ring 16 may be provided to distribute a sealing and lubricating fluid which is admitted through an inlet 18 in the tubular member 8.

An axially movable gland 20 is located at the outermost end of the stuffing box 6. The gland 20 has a portion 22 of reduced cross-section which contacts the packing material in order to compress the packing material into sealing engagement against the hard sleeve 4 of the rotating shaft 2.

The gland also has an enlarged annular portion 24 which has small recesses 26 on its outer face. Each of these recesses is adapted to receive the projecting tip 28 on a lever arm 30. It is this lever arm which transmits the force to the gland 20 in order to compress the packing material.

A cantilevered platform 32 is fixedly mounted directly above the stuffing box. At the extreme end of the platform 32 is a bearing sleeve 34 which carries the fulcrum shaft 36 for lever 30. A pneumatic cylinder 38 is fixedly attached atop the platform 32. This cylinder may be of conventional construction, having an internally located piston connected to a rod 40 which extends outwardly through a packing nut 42. Obviously, any type of expansible chamber device which is actuated by fluid pressure may be used in place of the cylinder.

The end of piston rod 40 rides against a plate 44 attached to the upper end of the lever 30. Thus, pressure which is led to cylinder 38 through its inlet 46 acts against the piston and causes the piston rod 40 to push against the lever 30. The lever, acting about its fulcrum or shaft 36, transmits this force to the gland 20 which compresses the packing.

During normal operations, a source of relatively low pressure is supplied to inlet 46. In one installation, 7 p.s.i. has proven to be an optimum pressure to hold the packing material in place and prevent leakage. Then, after a specified period of time, a pulse of higher pressure, 80 p.s.i., for example, is injected into the cylinder 38. This higher pressure causes the packing material 12 to be compressed and seat more firmly against the hard sleeve 4. Then, the higher pressure is released, and the lower pressure restored to hold the packing in place for normal operations.

In one installation, it has proven advantageous to exert the higher pressure for a two or three second interval every thirty minutes. This time interval and the pressures used may vary widely, depending on the speed of the shaft, the material being worked, the type of packing, and the size of the various elements in the combination.

Using this system, the overheating and wear of the packing has been greatly reduced, in comparison to that experienced with conventional hand-adjusted glands. Using conventional sealing means, it is necessary to tighten the gland to seal the packing more firmly against the shaft, to provide for some future deterioration of the packing, and to hold the packing in place. This necessarily requires that the packing be under a great compressive force at all times. However, by using a seal constructed in the manner disclosed hereinabove, only a relatively light compressive force is used at most times, and the strong compressive forces are applied relatively infrequently. For obvious reasons, this permits a shaft seal to be used for a considerably longer period than was known heretofore. In one installation, an abrasive pugmill, seals designed according to the present invention have been used in excess of five weeks, as contrasted to the four or five hour life of similar seals which were mechanically adjusted in a conventional manner.

Figure 2:
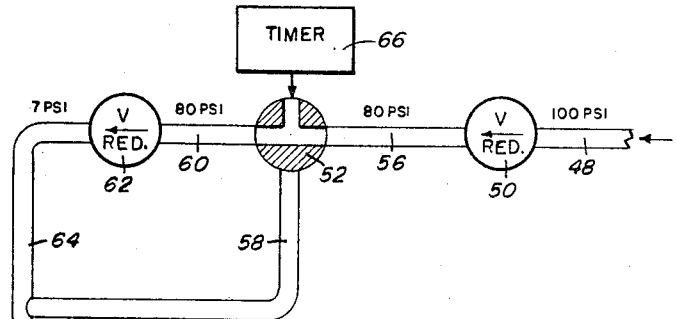
FIG. 2 is a diagrammatic sketch of the system which supplies air to the gland loading cylinder and piston shown in FIG. 1.

One means for supplying the pressure to cylinder 38 is shown in FIG. 2. Air under 100 p.s.i. pressure is carried from a source by a conduit 48. After passing through a reducing valve 50, the pressure is reduced to 80 p.s.i. This air then passes through the three-way valve 52 to another reducing valve 62, where it is reduced to 7 p.s.i. A conduit 58, normally closed, passes directly from the three-way valve to the pneumatic cylinder. The outlet of reducing valve 62 may be regarded as a source of low pressure air, and the outlet of reducing valve 50 may be considered to be a source of the high pressure air. The three-way valve 52 is normally in the position shown in FIG. 2, so that the low pressure air normally flows to the cylinder 38 through the conduit 64.

A timer device 66 is used to actuate the solenoid operated valve 52. As mentioned above, the valve will remain in the position shown in FIG. 2, except for the short time interval when the high pressure air is directed to the cylinder 38. During this interval, the valve will be automatically turned clockwise ninety degrees from the position shown in FIG. 2.

Numerous alternative means of accomplishing the present invention will be obvious to those skilled in the mechanical arts. The embodiments shown in FIGS. 3 and 4 are exemplary of two means which may be used.

Figure 3:
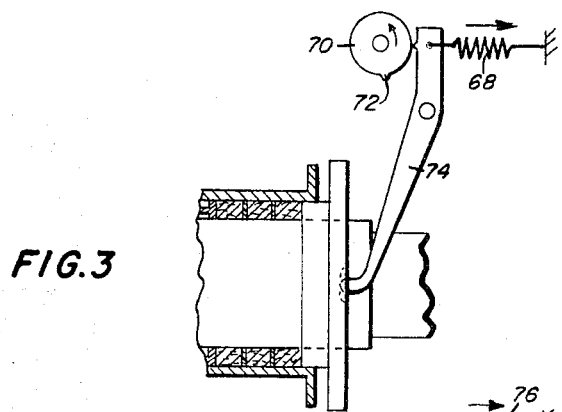
FIG. 3 shows a side view, partially in section, of a modified form of the invention using mechanical means for compressing the packing material.

In FIG. 3, a spring 68 is used to exert the normal operating compressive force on the packing material. The greater force which is expended for a short time interval is exerted by a rotating cam 70 with a small raised portion 72 which acts against the lever arm 74.

Figure 4:
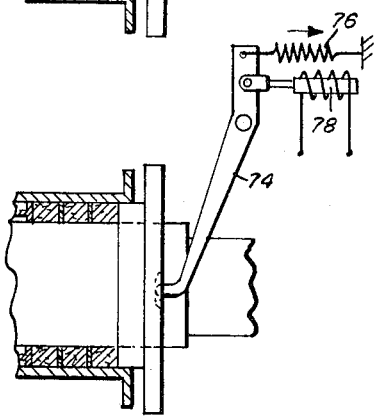
FIG. 4 is a side view, partially in section, of another modification which uses mechanical and electro-mechanical means for compressing the packing material.

In FIG. 4, a spring 76 is used to provide the normal operating force. The greater force is provided by an electrically operated solenoid 78 which is actuated for short time intervals. An unusually large solenoid may be necessary, so various additional mechanical or hydraulic force multiplying means may be used therewith if desired.

Other modifications will be obvious to those skilled in the art. It is well understood that the invention is not limited by the above disclosure, but that it encompasses all modifications which fall within the scope of the following claims.

I claim:

1. A shaft sealing device comprising a stuffing box, shaft packing material within said stuffing box and surrounding said shaft, fluid pressure means applying a compressive force against said packing material, first and second sources of fluid pressure in communication with said fluid pressure means, said second source having a greater pressure than said first source, normally closed valve means obstructing the flow from said second source to said fluid pressure means, whereby said valve means may be opened for relatively short time intervals to compress said packing to compensate for wear.

2. A shaft sealing device as defined in claim 1 wherein said first and second sources receive their pressure from a common conduit, and a pressure reducing valve is located in said conduit intermediate said sources.

3. A shaft sealing device as defined in claim 1 having timer means for opening said valve means for a short interval of time at predetermined periods of time.

4. A device for compressing the packing material in a shaft stuffing box in a wall of a chamber, said device having an axially movable gland contacting said packing material, normally operating means exerting a first force urging said gland against said packing material, normally idle means for exerting a second force urging said gland against said packing material, said second force having a greater magnitude than said first force, and timer means actuating said normally idle means for a short interval of time at predetermined periods of time.

5. A device as defined in claim 4 wherein said force exerting means are actuated by fluid pressure.

6. A device as defined in claim 5 wherein both said force exerting means include a common fluid pressure actuated means, a first source of fluid pressure, said normally operating means including a normally open conduit connecting said first pressure source with said fluid pressure actuated means, a second pressure source having a higher pressure than said first pressure source, said normally idle means including a normally closed conduit connecting said second pressure source with said fluid pressure actuated means, and said timer means opens said normally closed conduit to permit the flow of fluid therethrough.

7. A device as defined in claim 6 wherein said first and second sources receive their pressure from a common conduit, and a pressure reducing valve is located in said conduit intermediate said sources.

8. A device as defined in claim 6 wherein a first class lever is used to transmit a force exerted by said fluid pressure actuated means to said axially movable gland.

9. A device for exerting force on the packing material in a shaft stuffing box, said device comprising a movable gland contacting said packing material, an expansible chamber fluid pressure actuated device having a portion thereof mounted in a fixed position relative to said stuffing box, said fluid pressure actuated device having a movable portion exerting a force proportional to the pressure applied therewithin, a first class lever having its opposed ends contacting said gland and said movable portion, a first source of fluid pressure leading to said fluid pressure actuated device, a second source of fluid pressure leading to said fluid pressure actuated device, said second source having a higher pressure than said first source, and normally closed valve means interrupting the flow of fluid from said second source to said fluid pressure actuated device.

10. A device as defined in claim 9 having timer means which opens said valve means for a short time interval at predetermined periods.

11. A device as defined in claim 9 wherein said first and second sources of fluid pressure receive their pressure from a common conduit, and a pressure reducing valve is located between said second source and said first source.

12. A device as defined in claim 11 wherein said first source receives its pressure from said second source, a pressure reducing valve is located between said first source and said second source, and said valve is a three-way valve which interrupts the flow of fluid to said first source when the flow of fluid from said second source is permitted.

References Cited by the Examiner

UNITED STATES PATENTS

| | | | |
|---|---|---|---|
| 1,632,293 | 6/1927 | Johnson | 277—12 X |
| 1,947,017 | 2/1934 | McHugh | 277—27 |
| 2,096,899 | 10/1937 | Hornschuch | 277—27 |
| 2,148,844 | 2/1939 | Stone et at. | 277—73 |
| 2,285,007 | 6/1942 | Brennan et al. | 277—28 |
| 3,057,627 | 10/1962 | Main et al. | 277—3 |
| 3,061,314 | 10/1962 | Miller | 277—3 |

FOREIGN PATENTS

| | | |
|---|---|---|
| 1,143,793 | 4/1957 | France. |
| 396,061 | 7/1933 | Great Britain. |

SAMUEL ROTHBERG, *Primary Examiner.*